US006430239B1

(12) United States Patent
Ferreol

(10) Patent No.: US 6,430,239 B1
(45) Date of Patent: Aug. 6, 2002

(54) PROCESS OF CYCLIC DETECTION IN DIVERSITY OF POLARIZATION OF DIGITAL CYCLOSTATIONARY RADIOELECTRIC SIGNALS

(75) Inventor: Anne Ferreol, Colombes (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/235,383

(22) Filed: Jan. 22, 1999

(30) Foreign Application Priority Data

Jan. 23, 1998 (FR) .............................. 98 00731

(51) Int. Cl.⁷ ................................. H04L 1/02
(52) U.S. Cl. .................. 375/347; 342/361; 342/373; 342/383; 343/726; 343/756; 343/893
(58) Field of Search ................. 375/267, 347; 342/361, 362, 373, 383; 343/726–728, 756, 893

(56) References Cited

U.S. PATENT DOCUMENTS

| 4,606,054 A | * | 8/1986 | Amitay et al. ............... 375/102 |
| 5,068,668 A | * | 11/1991 | Tsuda et al. ................. 342/362 |
| 5,319,677 A | | 6/1994 | Kim |
| 5,367,539 A | * | 11/1994 | Copley ........................ 375/100 |
| 5,592,177 A | | 1/1997 | Barrett |
| 5,691,727 A | * | 11/1997 | Cyzs ........................... 342/361 |

OTHER PUBLICATIONS

Randy S. Roberts, et al. "Computationally Efficient Algorithms for Cyclic Spectral Analysis", IEEE Signal Processing Magazine, vol. 8 No. 2, Apr. 1991, pp. 38–49.

* cited by examiner

*Primary Examiner*—Stephen Chin
*Assistant Examiner*—Dac V. Ha
(74) *Attorney, Agent, or Firm*—Oblon, Spivak, McClelland, Maier & Neustadt, P.C.

(57) ABSTRACT

The disclosure relates to a process of cyclic detection in diversity of polarization of digital cyclostationary radioelectric signals. The process consists in acquiring the signals on a network of at least two of antennas, in calculating a cyclic covariance matrix on a first moment, and on a second moment, of a spectral correlation of the digital signals acquired, and in detecting peaks of spectral correlation by comparing a likelihood ratio with a detection threshold determined statistically. The invention is applicable notably to digital radioelectric signals emitted by a satellite.

8 Claims, 4 Drawing Sheets

1st MOMENT

2nd MOMENT

PROCESS OF CYCLIC DETECTION IN DIVERSITY OF POLARIZATION OF DIGITAL CYCLOSTATIONARY RADIOELECTRIC SIGNALS

BACKGROUND OF THE INVENTION

The present invention concerns a process of cyclic detection in diversity of polarization of digital cyclostationary radioelectric signals. Notably, the invention concerns the detection of such radioelectric signals by two antennas of radiation diagram sensitive to orthogonal polarization of the signals. The invention is applicable in the field of radiocommunications.

DESCRIPTION OF THE PRIOR ART

In the field of radiocommunications, the utilization of digital signals is rapidly increasing. During a radio communication a transmitter emits radioelectric signals in one or more frequency channels each characterized by a frequency bandwidth $B_{max}$ and a central frequency. The signals transmitted in these frequency channels are characterized by a number of parameters such as the binary bit rate, the modulation index and the carrier frequency. Appendix A contains a glossary of terms used in the text. There are known techniques for calculating the spectral correlation or the cyclic correlation of cyclostationary signals to determine these parameters and detect these signals. Appendix B contains some definitions and properties concerning cyclostationary signals, 2nd order cyclic statistics and the spectral correlation of such signals. Known systems implementing these techniques perform this detection using a signal received on a single antenna. Notably, the known FAM algorithm (meaning Fast Fourier Transform Accumulation Method) has been the object of numerous publications, in particular those of the colloquium "4th ASSP Workshop on spectrum modeling, August 1988", such as "Digital implementation of spectral correlation analyzers" by W. A. Brown, H. H. Loomis, and "Computationally efficient algorithms for cyclic spectral analyzers' by R. S. Roberts, W. A. Brown, H. H. Loomis. The FAM algorithm enables rapid calculation of the estimators of spectral correlation by means of FFT in the whole cyclic frequency/harmonic frequency $(\alpha,f)$ space.

The estimator of the first moment $E[x(f_k)x(f_m)^*]$ is expressed as:

$$\hat{\gamma}_{x1}(\alpha_0, f_0) = \sum_{t=1}^{K} x(f_k, t)x(f_m, t)^* \exp\{-j2\pi\delta\alpha t\} \quad (1)$$

with $f_0 = \frac{f_k + f_m}{2}$ and $\alpha_0 = f_k - f_m + \delta\alpha$

The estimator of the second moment $E[x(f_k)x(-f_m)]$ is expressed as:

$$\hat{\gamma}_{x2}(\alpha_0, f_0) = \sum_{t=1}^{K} x(f_k, t)x(-f_m, t)\exp\{-j2\pi\delta\alpha t\} \quad (2)$$

with $f_0 = \frac{f_k - f_m}{2}$ and $\alpha_0 = f_k + f_m + \delta\alpha$

The signals $x(f,t)$ are calculated by a bank of band filters $B_{canal}$ and central frequency filters denoted $f_k$, $f_m$. The signal $x(f,t)$ therefore has a band equal to $B_{canal}$. To obtain the exact frequency representation of the signal $x(t)$, $B_{canal}$ must be very much smaller than the band B of the signal $x(t)$. Since $x(f)$ is calculated in a non-null band, this signal $x(f)$ evolves with time and is therefore a function of f and t: $x(f,t)$. In a first stage, the signals $x(f_k,t)$ and $x(f_m,t)^*$ are intercorrelated after having been displaced to the base band. These signals being in a non-null band $B_{canal}$, the signal $z(t)$ obtained evolves with time in a band of width $2 \times B_{canal}$. Given that $z(t)$ is in a non-null band and that the correlation peak in cyclic frequency does not necessarily lie in $f_k-f_m$, it is necessary to perform a Fourier transform of $z(t)$ to obtain the offset $\delta\alpha$ of this correlation peak.

To enable a rapid calculation of the estimators of spectral correlation, $\hat{\gamma}_{x1}$ and $\hat{\gamma}_{x2}$, the FAM algorithm is implemented in several stages.

In a first stage, the signals $x(f_k,t)$ and $x(-f_m,t)$ are calculated by a system of smooth FFTs. The difference $\Delta\alpha = f_{k+1} - f_k$ between the frequencies $f_{k+1}$ and $f_k$ is constant and the sampling frequency of the signals $x(f,t)$ is $$Fe_{canal} = \frac{Fe}{RE},$$

where RE is the shift of the moving windows (expressed as a number of samples) and Fe is the sampling frequency of $x(t)$.

In a second stage, the signal $z(t)=x(f_k,t) \times x(f_m,t)^*$ is calculated for the first moment and the signal $z(t)=x(f_k,t) \times x(-f_m,t)$ is calculated for the second moment.

In a third stage, an FFT is performed on the signal $z(t)$ on a number of samples.

On the first moment to calculate the spectral correlation in $$f = \frac{(f_k + f_m)}{2}$$

and for $\alpha$ lying between $\alpha_{min}=f_k-f_m-\Delta\alpha/2$ and $\alpha_{max}=f_k-f_m+\Delta\alpha/2$ on K samples, an FFT of the signal $z(t)=x(f_k,t) \times x(f_m,t)^*$ must be performed on K samples. The K frequency sales of the resulting signal $z(\alpha_k)$ represent the spectral correlation in $$f = \frac{(f_k + f_m)}{2}$$

with $\alpha_k$ lying between $$\alpha_{min} = f_k - f_m - \frac{Fe_{canal}}{2}$$

and $$\alpha_{max} = f_k - f_m + \frac{Fe_{canal}}{2}.$$

Since $Fe_{canal}$ is greater than $\Delta\alpha$, only the cyclic frequencies $\alpha_k$ contained in the interval $(f_k-f_m-\Delta\alpha/2) \ldots (f_k-f_m+\Delta\alpha/2)$ are retained. All the outputs $X(f_k,t)$ and $x(f_m,t)$ of the bank of filters are correlated to obtain the points of the spectral correlation in the zone of interest of the first moment, in other words for $\alpha < B_{max}$.

On the second moment, the calculation of the spectral correlation is limited in harmonic frequency by $B_{max}$.

The FAM algorithm described previously is applicable only to signals from a single antenna. However, in the field of radiocommunications signals propagate with a degree of polarization and the gain of all antennas is dependent on the polarization of the signals received. This polarization dependence means that a single antenna filters the sources and can even completely cancel out the signals received, which would make detection of the sources impossible. This remark is true whatever algorithm is used, in particular a FAM algorithm.

SUMMARY OF THE INVENTION

The object of the invention is to propose a solution to this problem. For this purpose, the invention is a process of cyclic detection in diversity of polarization of digital cyclostationary radioelectric signals of sampling frequency Fe transmitted in a frequency channel of bandwidth $B_{max}$ and received on a network of N antennas, N being at least two, whose radiation diagram has a maximum maximorum of sensitivity wherein, for any pair of antennas, said process consists in acquiring over an observation period T and in an acquisition band $B_{acq}$ the digital signals output by the antennas, in calculating, for each cyclic frequency of a determined cyclic frequency/harmonic frequency space limited by the bandwidth $B_{max}$ of the frequency channel and the acquisition band $B_{acq}$ of the digital signals acquired, a cyclic covariance matrix on a first moment of a spectral correlation of the digital signals acquired, and a cyclic covariance matrix on a second moment of a spectral correlation of the digital signals acquired, and in detecting peaks of spectral correlation by comparing a likelihood ratio determined from each said cyclic covariance matrix with a detection threshold determined statistically.

The invention consists in a cyclic detection test of radioelectric signals received by any pair of antennas of a network of N antennas whose radiation diagram presents a maximum maximorum (maximum of the maxima) of sensitivity.

In a first embodiment of the process, the network includes N=2 antennas whose maximums maximorum of sensitivity point in orthogonal directions.

In a second embodiment of the process, the network includes N=2 antennas whose maximums maximorum of sensitivity point in the same direction.

The main advantage of the invention is that it performs a rapid test of detection of radioelectric signals of arbitrary polarization by calculating a likelihood ratio using a simple relation. In the case of a network with two antennas and in the absence of a source, the likelihood ratio follows a statistical chi-square law with 8 degrees of freedom. The knowledge of the probability law of the likelihood ratio in the absence of a source enables a detection threshold to be calculated with a certain probability of false alarm to judge the presence of a source in a determined part of the cyclic frequency/harmonic frequency space.

The cyclic detection test of the likelihood ratio is based on two antennas and is also statistical. Consequently, the detection is not made using an empirical detection threshold.

The process according to the invention also provides the advantage of enabling the differentiation of radioelectric signals present in the same frequency channel but transmitted at different bit rates. The process according to the invention advantageously enables separation of radioelectric signals according to their modulation frequency and their transmission bit rate.

DESCRIPTION OF THE DRAWINGS

Other advantages and characteristics of the invention will appear on reading the following description making reference to the attached drawings of which.

In these figures, elements representing the same things all carry the same reference number.

DETAILED DESCRIPTION OF THE INVENTION

Figure 1:
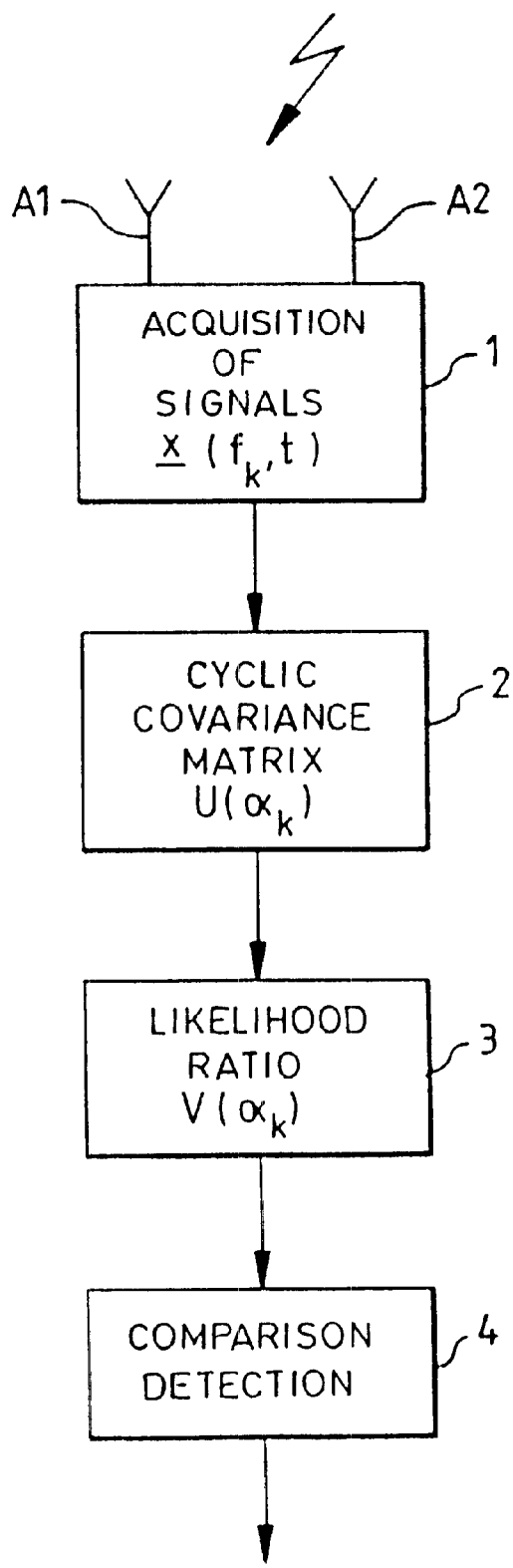
FIG. 1 is a block diagram representing the process according to the invention.

FIG. 1 illustrates the implementation of the process according to the invention, which has four main stages. In a first stage, 1, the digital radioelectric signals of sampling frequency Fe, emitted by a source in a transmission frequency channel of band $B_{max}$, are received by a network of N antennas A1, A2, . . . AN (where N≧2; N=2 in the example shown in FIG. 1). The output signals of the antennas are acquired over an observation period T and in an acquisition band $B_{acq}$, then stored in vectors $\underline{x}(f_k,t)$. The acquisition 1 of the digital output signals of the antennas A1, AN consists in filtering each digital signal received on an antenna in packets of K samples by a bank of M elementary band filters $B_{canal}$, whose outputs are under-sampled by a decimation factor RE and whose given central frequencies are denoted $f_k$, $f_m$ (k and m ranging from 1 to M), and K is given by the relation:

$$K = \frac{T \times Fe}{RE}.$$

The bank of M filters is such that their central frequencies constitute a regular division of an acquisition band $B_{acq}$ such that $B_{acq} \leq M \times B_{canal}$. The filtering is performed by applying a FFT using techniques known to persons skilled in the art. After filtering, the filtered digital signal are stored in vectors $\underline{x}(f_k, t)$ whose components $x_1(f_k,t)$, $x_2(f_k,t)$, . . . , $x_N(f_k,t)$ correspond to the signals from the different antennas A1, AN filtered by the same filter of determined central frequency $f_k$.

In a second stage, 2, the vectors $\underline{x}(f_k,t)$ are used to calculate cyclic covariance matrices $U(\alpha_k)$ on a first moment of a spectral correlation of the digital signals acquired and on a second moment of a spectral correlation of the digital signals acquired.

In a third stage, 3, a likelihood ratio $V(\alpha_k)$ is determined from the matrices of covariance $U(\alpha_k)$ and is compared in stage 4 with a threshold determined statistically by a chi-square law. The comparison enables determination of the harmonic frequency/cyclic frequency doublets $(f_0, \alpha_0)$ for which at least one source has been detected.

During a radio communication, received from a satellite for example, the polarization of the radio signals changes depending on the propagation milieu. The network of antennas used includes N antennas, with $N \geq 2$. These antennas have a radiation diagram presenting a maximum maximorum of sensitivity in a given direction.

In a first embodiment of the process, the network includes a number N of antennas equal to 2 whose maximums maximorum of sensitivity point in orthogonal directions. In other embodiments of the invention, the process can be implemented with any pair of antennas of a network of N antennas having a radiation diagram presenting a maximum maximorum of sensitivity in a given direction.

In the presence of a source, corresponding for example to the satellite transmission, with an incident azimuth-elevation $(\theta_0, \Delta_0)$ and polarization $P_0$, the signal received on the antenna "n" is the following:

$$x_n(t) = s(t) a_n(\theta_0, \Delta_0, P_0) + b_n(t) \quad (3)$$

where $a_n(\theta_0, \Delta_0, P_0)$ is the response of the antenna "n" in the direction $(\theta_0, \Delta_0)$ and at polarization $P_0$, $b_n(t)$ is the additive noise, $s(t)$ is the modulation of the signal emitted by the source.

The signal received on the set of N antennas is a signal vector of dimension N whose expression is as follows:

$$\underline{x}(t) = s(t)\underline{a}(\theta_0, \Delta_0, P_0) + \underline{b}(t) \quad (4)$$

where $\underline{x}(t) = [x_1(t) \ldots x_N(t)]^t$, $\underline{a}(\theta_0, \Delta_0, P_0) = [a_1(\theta_0, \Delta_0, P_0) \ldots a_N(\theta_0, \Delta_0, P_0)]^t$, $\underline{b}(t) = [b_1(t) \ldots b_N(t)]^t$.

The vector $\underline{a}(\theta_0, \Delta_0, P_0)$ is called the director vector. The polarization $P_0$ can be decomposed into a horizontal component $P_{H0}$ and a vertical component $P_{V0}$. The director vector has the characteristic of decomposing linearly into two components:

$$\underline{a}(\theta_0, \Delta_0, P_0) = P_{H0}\underline{a}_H(\theta_0, \Delta_0) + P_{V0}\underline{a}_V(\theta_0, \Delta_0)$$

where $\underline{a}_H(\theta_0, \Delta_0)$ is the response of the network of antennas for horizontal polarization in a direction $(\theta_0, \Delta_0)$, $\underline{a}_V(\theta_0, \Delta_0)$ is the response of the network of antennas for vertical polarization in a direction $(\theta_0, \Delta_0)$.

After detection, goniometry is generally applied to locate the detected sources. Given the decomposition of the polarization $P_0$, the goniometry is performed using two calibration tables: the first for horizontal polarization, the second for vertical polarization.

On the first and second moments of the spectral correlation the cyclic covariance matrices are defined by the relations:

$$R_x(\alpha, f) = E\left[\underline{x}\left(f + \frac{\alpha}{2}\right)\underline{x}\left(f - \frac{\alpha}{2}\right)^+\right] \text{ for the 1st moment} \quad (5)$$

$$C_x(\alpha, f) = E\left[\underline{x}\left(f + \frac{\alpha}{2}\right)\underline{x}\left(\frac{\alpha}{2} - f\right)^t\right] \text{ for the 2nd moment} \quad (6)$$

The cyclic covariance matrices cover all the intercorrelations taken two-by-two between the antennas. Therefore the term of line $n_1$ and column $n_2$ of the cyclic covariance matrices represents the cyclic intercorrelation between antennas $n_1$ and $n_2$.

$$R_x(\alpha, f)_{(n1,n2)} = E\left[x_{n1}\left(f + \frac{\alpha}{2}\right)x_{n2}\left(f - \frac{\alpha}{2}\right)^*\right] \text{ for the 1st moment} \quad (7)$$

$$C_x(\alpha, f)_{(n1,n2)} = E\left[x_{n1}\left(f + \frac{\alpha}{2}\right)x_{n2}\left(\frac{\alpha}{2} - f\right)\right] \text{ for the 2nd moment} \quad (8)$$

Assuming that the noise is stationary, the cyclic covariance matrices are expressed as follows as a function of the director vector $\underline{a}(\theta_0, \Delta_0, P_0)$ and of the spectral correlation of the signal $s(t)$:

$$R_x(\alpha,f) = \gamma_{s1}(\alpha,f) \, \underline{a}(\theta_0,\Delta_0,P_0) \, \underline{a}(\theta_0,\Delta_0,P_0)^+ \text{ for the 1st moment} \quad (9)$$

$$C_x(\alpha,f) = \gamma_{s2}(\alpha,f) \, \underline{a}(\theta_0,\Delta_0,P_0) \, \underline{a}(\theta_0,\Delta_0,P_0)^t \text{ for the 2nd moment} \quad (10)$$

Therefore, when the signal $s(t)$ has a non-null spectral correlation on the first or second moment, the associated cyclic covariance matrix is of rank 1. Consequently, the cyclic covariance matrices have the same cyclic properties as the spectral correlation of the signal undergoing goniometry.

In reality, these cyclic covariance matrices are estimated on BT independent samples (or snapshots) in the same manner as the spectral correlations:

for the 1 st moment:

$$\hat{R}_x\left(f_k - f_m + \delta\alpha, \frac{(f_k + f_m)}{2}\right) = \sum_{t=1}^{K} \underline{x}(f_k, t)\underline{x}(f_m, t)^+ \exp\{-j2\pi\delta\alpha t\} \quad (11)$$

for the 2nd moment:

$$\hat{C}_x\left(f_k + f_m + \delta\alpha, \frac{(f_k - f_m)}{2}\right) = \sum_{t=1}^{K} \underline{x}(f_k, t)\underline{x}(-f_m,t)^t \exp\{-j2\pi\delta\alpha t\} \quad (12)$$

During the treatment, the triplets $(f_k, f_m, \delta\alpha)$ detected cyclically are stored then re-used to integrate the cyclic matrices and to perform the goniometry. Consequently, the vectorial signals $\underline{x}(f_p,t)$ and $\underline{x}(-f_p,t)$ must be stored in a file. We note that the samples $\underline{x}(f_k,t)$ and $\underline{x}(f_k,t+1)$ are not necessarily independent, which is why K is greater than or equal to BT. The relation between K and BT depends on the sampling frequency $Fe_{canal}$, $$Fe_{canal} = \frac{Fe}{RE},$$

and the band $B_{canal}$ of the signals $\underline{x}(f_k,t)$ as shown by the following expression:

$$BT = \frac{B_{canal} \times K}{Fe_{canal}} \quad (13)$$

To know the pairs $(\alpha_n, f_n)$ for which at least one source is detected, a cyclic detection test according to the invention is implemented to detect the sources. This cyclic detection test depends on the product BT, where $B=B_{canal}$ corresponds to the band of the signals $x(f,t)$ and $$T = \frac{K}{Fe_{canal}}$$

corresponds to the time of integration of the covariance matrices that coincide with the duration of observation.

The purpose of this cyclic detection test is to count the number of sources present at the same time for the cyclic frequency 1 harmonic frequency point $(\alpha_0, f_0)$. In the presence of M sources in $(\alpha_0, f_0)$, the model of the signal becomes:

$$\underline{x}(t) = \sum_{m=1}^{M} s_m(t)\underline{a}(\theta_m, \Delta_m, P_m) + \sum_{m'=M+1}^{M_T} s_{m'}(t)\underline{a}(\theta_{m'}, \Delta_{m'}, P_{m'}) + \underline{b}(t) \quad (14)$$

According to this model, $M_T$ sources are received of which M have energy for their spectral correlation in $(\alpha_0, f_0)$. According to this model, classically (use of the covariance matrix) $M_T$ sources must be goniometered, whereas in cyclic (use of the cyclic covariance matrix) only M sources must be goniometered. In effect, the cyclic covariance matrices have the characteristic of isolating some of the sources.

This cyclic detection test consists in estimating the number of singular non-null values of an intercorrelation matrix between the signals $\underline{x}_t$ and $\underline{v}_t$ which then enables the rank of this matrix to be estimated. Depending on whether the first or second moment is used, these signals $\underline{x}_t$ and $\underline{v}_t$ are given by:

$$\underline{x}_t = \underline{x}\left(f_0 + \frac{\alpha_0}{2}, t\right) \text{ and } \underline{y}_t = \underline{x}\left(f_0 - \frac{\alpha_0}{2}, t\right) \text{ (1st moment)} \quad (15)$$

$$\underline{x}_t = \underline{x}\left(f_0 + \frac{\alpha_0}{2}, t\right) \text{ and } \underline{y}_t = \underline{x}\left(\frac{\alpha_0}{2} - f_0, t\right)^* \text{ (2nd moment)} \quad (16)$$

This intercorrelation is performed on K samples which correspond to BT statistically independent samples:

$$\hat{R}_{xy} = \frac{1}{K}\sum_{t=1}^{K} \underline{x}_t \underline{y}_t^+ \quad (17)$$

The rank of $\hat{R}_{xy}$ is estimated from the rank of its normalized form R. Knowing that the time-dependent signals $\underline{x}_t$ and $\underline{v}_t$ are Gaussian processes, in the presence of $M_0$ cyclic sources the likelihood ratio of the $N-M_0$ lowest eigenvalues of R obey a chi-square law with $2(N-M_0)^2$ degrees of freedom:

$$V_{cyclic}([M=M_0]/M_0) = -2BT\ln\left(\left[\prod_{m=M+1}^{N}\mu_m\right]\right) \quad (18)$$

with $R = I - UU^+$
where $U = \hat{R}_x^{-1/2}\hat{R}_{xy}\hat{R}_y^{-1/2}$, $\mu m$ are eigenvalues of R, and N is the number of antennas.

The cyclic detection test consists in making an almost classic detection test on the normalized Hermitian matrix R. For this matrix the eigenvalues of noise are exactly equal to 1. This is why in this likelihood ratio the logarithm of the average value of the noise is not subtracted. The only difference compared with the classic approach is the number of degrees of freedom: $2(N-M_0)^2$ instead of $(N-M_0)^2-1$.

Knowledge of the statistics of $V_{cyclic}(M_0/M_0)$ enables a threshold $\beta_M$ to be fixed for which the probability of having strictly more than M sources is close to 1 ($p_d \sim 1$). The test is the following:

if $V(M/M_0) > \beta_M$, the number of sources $M_0$ present is greater than M, if $V(M/M_0) < \beta_M$, the number of sources $M_0$ present is less than or equal to M.

To determine the number of the sources $M_0$, the test first tests the presence of M=0 sources then of M=1 source until $V(M/M_0)$ is less than the threshold $\beta_M$. The number of sources is then $M_0 = M$.

The process according to the invention is applicable to any pair of antennas, i.e. N=2. The likelihood ratio defined above by the relation (18) is calculated with the antennas "1" and "2", in the whole cyclic frequency/harmonic frequency space $(\alpha_0, f_0)$, then a detection threshold of at least one source is fixed. In the absence of source the likelihood ratio of the cyclic detection test obeys a chi-square law with $2 \times 2^2 = 8$ degrees of freedom and becomes:

$$V_{xd}^2 \text{cyclic}(\alpha_0, f_0) = -2BT\ln[det[I - U_{xd}(\alpha_0, f_0)U_{xd}(\alpha_0, f_0)^+]] \quad (20)$$

where $$U_{x1}(\alpha_0, f_0) = \hat{R}_z(\alpha_0, f_0) \text{ on the 1st moment} \quad (21)$$

where $$U_{x2}(\alpha_0, f_0) = \hat{C}_z(\alpha_0, f_0) \text{ on the 2nd moment} \quad (22)$$

(d taking the value 1 for the first moment, and the value 2 for the second moment)

where $$\underline{z}(f,t) = \hat{R}_x(f)^{-1/2}\underline{x}(f,t) \quad (23)$$

where det[] designates the determinant,
$\hat{R}_x(f_0)$ is the covariance matrix at frequency $f_0$ of the signal $\underline{x}(t) = [x_1(t)x_2(t)]^t$
and $\hat{R}_z(\alpha_0, f_0)$ and $\hat{C}_z(\alpha_0, f_0)$ are the cyclic covariance matrices of the signal $\underline{z}(t) = [z_1(t)z_2(t)]^t$.

Knowledge of the probability law of the likelihood ratio in the absence of a source enables calculation of the detection threshold with a certain false alarm probability.

When N=2, the matrix $\hat{R}_x(f)^{-1/2}$ has for example the following literal expression:

$$\hat{R}_x(f)^{-1/2} = \frac{1}{\sqrt{R_x(f)_{(1,1)}}}\left[\frac{R_x(f)_{(1,2)}^{*1}}{\sqrt{det[R_x(f)]}} \frac{R_x(f)_{(1,1)}^{0}}{\sqrt{det[R_x(f)]}}\right] \quad (24)$$

This expression can be used to calculate easily the likelihood ratio $V_{xd}^2$ cyclic$(\alpha, f)$ in the whole cyclic frequency/harmonic frequency space. The calculation of $V_{xd}^2$ cyclic $(\alpha_0, f_0)$ is simplified by knowledge of the literal expression of the determinant of the 2×2 matrix: $I - U_{xd}(\alpha, f)U_{xd}(\alpha, f)^+$. The cyclic detection test is the following:

if $V_{xd}^2$cyclic$(\alpha_0, f_0) >$ threshold $[X^2(8), p_{fa}]$ \quad (25)

then there is a source in $(\alpha_0, f_0)$.

The detection threshold is in this case determined from the chi-square law with 8 degrees of freedom for a certain probability of false alarm $p_{fa}$ as low as possible. The cyclic detection test according to the invention is illustrated by examples obtained by simulation (FIGS. 2 to 7).

FIGS. 2, 3, 4 and 5 illustrate the case of sources with the same bit rate (25 kbit/s) but with different modulation frequencies.

Figure 6:
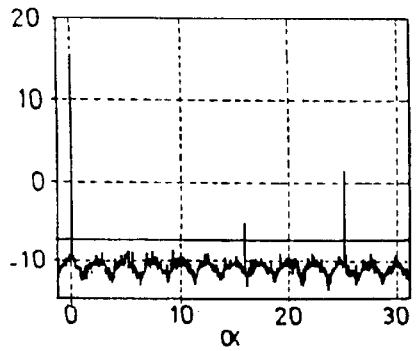
FIG. 6 shows a projection on the axis $\alpha$ of the cyclic frequencies of the likelihood ratio in the case of two sources corresponding to the same frequency channel but transmitted at different bit rates.
Figure 7:
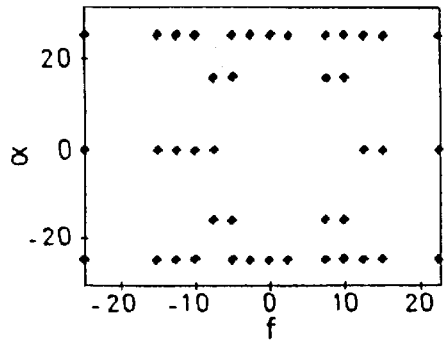
FIG. 7 shows the result of the test of detection in the cyclic frequency/harmonic frequency space carried out on the likelihood ratio shown in FIG. 6.

FIGS. 6 and 7 illustrate the case of sources with different bit rates but lying in the same frequency channel.

Figure 2:
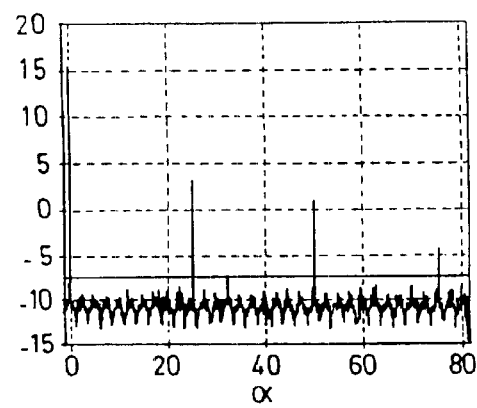
FIG. 2 is a projection on the axis a of the cyclic frequencies of the likelihood ratio in the case of three sources corresponding to different frequency channels and transmitted at the same bit rate of 25 kbit/s.
Figure 3:
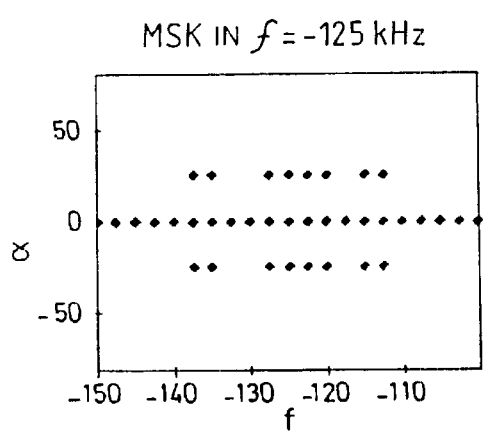
FIGS. 3 and 4 show the result of the detection test in the cyclic frequency/harmonic frequency space carried out on the likelihood ratio shown in FIG. 2.
Figure 4:
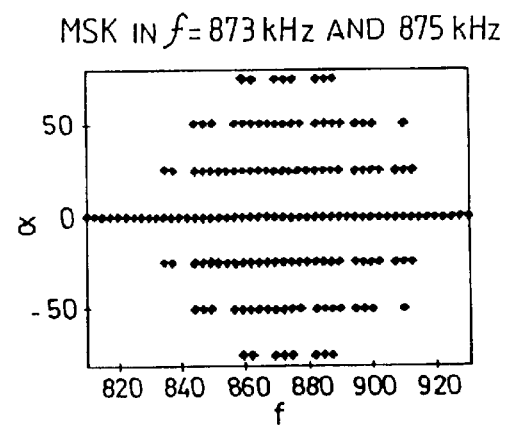

FIG. 2 shows the likelihood ratio, on the first moment, in the presence of three MSKs of the same bit rate equal to 25 kbit/s. The integration time is BT=150 independent samples.

For eight degrees of freedom the detection threshold is located at −7. All the correlation peaks whose level is greater than this threshold are detected. The cyclic detection test gives a result illustrated in FIGS. 3 and 4, in the cyclic frequency/harmonic frequency space. The cyclic detection test successfully detects the three MSK sources.

Figure 5:
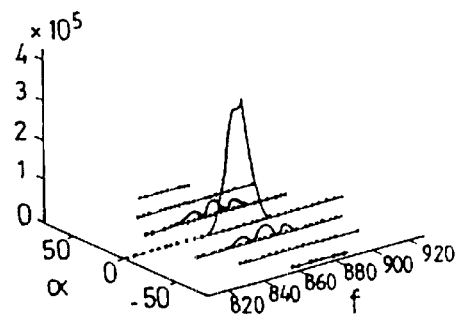
FIG. 5 shows a trace in the cyclic frequency/harmonic frequency space delimited by FIG. 4 of the level of the spectral correlation of the signal at the points $(\alpha_k, f_k)$ where a source has been detected.

A correlation peak is obtained every 25 kHz since the 3 MSKs have a bit rate of 25 kbit/s. To confirm that it is indeed an MSK, a trace of the level of spectral correlation of the signal at the points $(\alpha_k, f_k)$ where a source has been detected can be performed. This is illustrated in FIG. 5.

FIG. 6 represents the likelihood ratio on the axis of the cyclic frequencies $\alpha$ on the first moment. For eight degrees of freedom, the detection threshold is located at −7. All the correlation peaks whose level is greater than this threshold are detected. This enables a correlation peak to be detected at $\alpha$ 16 kHz and at $\alpha$=25 kHz. The cyclic detection test gives a result illustrated in FIG. 7 in the cyclic frequency/harmonic frequency space. The cyclic detection test enables detection of the two sources located in the same frequency channel and differentiated by their bit rate.

Figure 8:
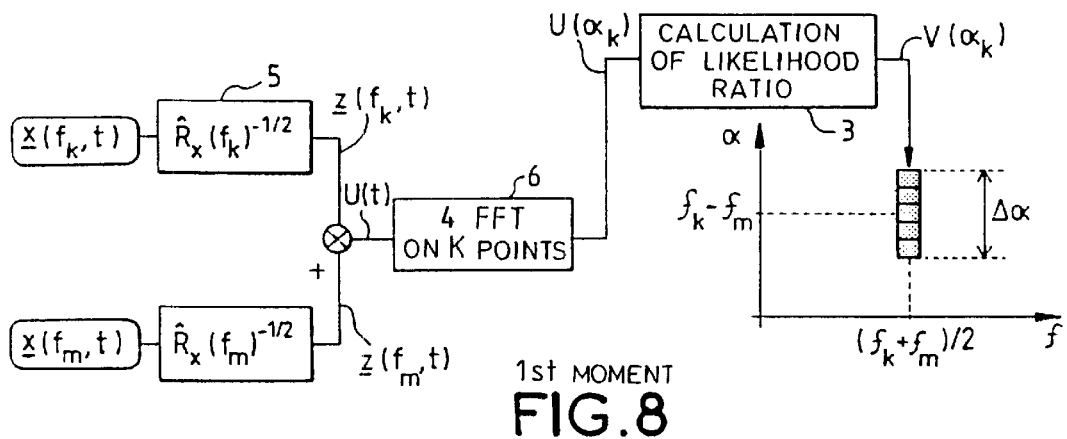
FIG. 8 is a block diagram of an. algorithm on the first moment of a process according to the invention.
Figure 9:
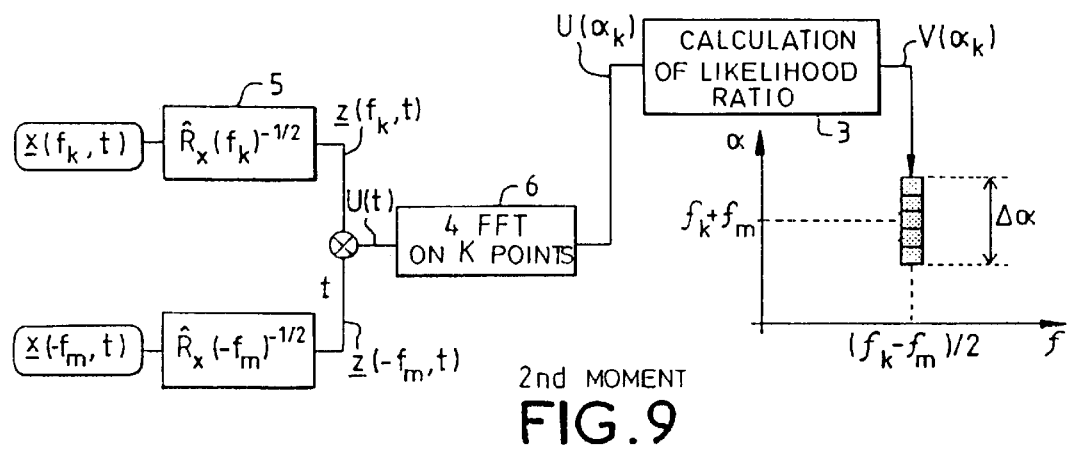
FIG. 9 is a block diagram of an algorithm on the second moment of a process according to the invention.

Finally, the process according to the invention can be schematized in a condensed manner as in FIG. 8 for the first moment and by FIG. 9 for the second moment. The vectors signals $\underline{x}(f_k,t)$ and $\underline{x}(f_m,t)$, obtained during the acquisition by any pair of N=2 antennas, are whitened 5 with the matrices $\hat{R}_x(f_k)^{-1/2}$ and $\hat{R}_x(f_m)^{-1/2}$ given by the relation (24) to obtain the vectors signals $\underline{z}(f_k,t)$ and $\underline{z}(f_m,t)$. These vectors signals enable the calculation of the K matrices $U(t)=\underline{z}(f_k,t).\underline{z}(f_m,t)^+$ of dimension 2×2 whose components are denoted $u_{ij}$.

A FFT 6 is performed for each component $u_{ij}$ on K points by taking the K components $u_{ij}$ of the K matrices U(t). Given that the matrices U(t) have dimension 2×2, this leads us to perform four FFTs on K points.

The K resulting matrices $U(\alpha_k)$ are of the same dimension 2×2 as the matrices U(t).

The K matrices $U(\alpha_k)$ enable the calculation 3 of the likelihood ratio $V(\alpha_k)$ using the relation:

$$V(\alpha_k) = -2.BT \ln [det[I-U(\alpha_k)U(\alpha_k)^+]]$$

This simple expression enables rapid calculation of the likelihood ratio at the harmonic frequency $$f = \frac{(f_k + f_m)}{2}$$

and at the cyclic frequencies $\alpha_k$ lying between $\alpha_{min}=f_k-f_m-\Delta\alpha/2$ and $\alpha_{max}=f_k-f_m+\Delta\alpha/2$.

The frequency doublets $(f_k,f_m)$ are such that they enable the calculation of the likelihood ratio for cyclic frequencies less than $\alpha_{max}$.

The cyclic detection test, according to the relation (25), is performed on each of the points of the likelihood ratio calculated previously. This enables the doublets $$\left(\frac{(f_k + f_m)}{2}, \alpha_k\right)$$

for which at least one source has been detected to be deduced.

On the second moment (FIG. 9) the principle of the algorithm is the same as that for the first moment by correlating the vectors $\underline{z}(f_k,t)$ and $\underline{z}(-f_m,t)$. The calculation 3 of the likelihood ratio is in this case limited on the harmonic frequencies by $B_{max}$.

Appendix A

GLOSSARY

A.1. Standard conventions:
  $x^*$: conjugate of x
  $\underline{x}^1$: transposition of the vector $\underline{x}$
  $\underline{x}^+$: conjugate transposition of the vector $\underline{x}$
  $X^T$: transposition of the matrix X
  $X^+$: conjugate transposition of the matrix X
  $X^{-1}$: inverse of X
  E[.]: mathematical expectation
  $\hat{x}$, $\hat{X}$: estimated values
  x*y: convolution of the signals x and y
  $\otimes$: Kronecker product
  BPSK: bi-phase shift keying (linear modulation in two phase states)
  MSK: minimum shift keying (modulation index 0.5, continuous phase)
  FSK: frequency shift keying
  FFT: Fast Fourier Transform
  In: natural (naperian) logarithm
A.2. Integer constants:
  N: number of antennas
  $M_T$: number of sources to be goniometered according to classical methods
  M: number of sources to be goniometered according to the invention
  B: frequency band
  $B_{canal}$: elementary frequency band of a filter of a bank of filters.
  $B_{max}$: frequency band of a transmission frequency channel.
A.3. Scalar variables:
  $x_n(.)$: observation on the antenna "n"
  s( ): time-dependent modulation of the signal emitted by the source
  $b_n( )$: additive noise on the antenna "n"
  Fe: sampling frequency of x(t)
  $a_n(\theta_0,\Delta_0,P_0)$: response of the antenna "n" in direction $(\theta_0,\Delta_0)$ and at polarization $P_0$
  $\theta_0$: azimuth of the direction of incidence of the signal emitted by the source
  $\Delta_0$: elevation of the direction of incidence of the signal emitted by the source
  $S_m( )$: time-dependent modulation signal of the signal emitted by the source "m"
  $f_p$, $f_0$, $f_k$, $f_m$, f: harmonic frequencies
  $\alpha$, $\alpha_0$: cyclic frequencies RE: decimation factor, expressed as a number of samples $\mu_m$: eigenvalue of R A.4. Vectorial and matrix variables:

$\underline{x}$: vector signal of dimension N corresponding to the signal received on the N antennas I: identity matrix $R_x$: covariance matrix of the vector $\underline{x}$ $R_y$: covariance matrix of the vector $\underline{y}$ $\underline{a}(\theta_0,\Delta_0,P_0)$: director vector of dimension N corresponding to the response of the N antennas in the direction $(\theta_0,\Delta_0)$ and at polarization $P_0$ $P_0$: polarization of the signal s(t)

$R_{xy}$: intercorrelation matrix between the vectors $\underline{x}_t$ and $\underline{y}_t$ R: normalized Hermitian matrix of the matrix $\hat{R}_{xy}$ Appendix B Cyclostationary Signals Received on a Sensor 2nd Order Cyclic Statistics and Spectral Correlation A signal is non-stationary when its statistical distribution is time-dependent. In this class, the cyclostationary signals have statistics varying periodically over time. In the case of digital signals (BPSK, FSK, etc.), these periodicities depend in particular on the bit rate of the modulation and the carrier frequency. The 2nd order statistics of a signal x(t) are completely characterized by the first moment $r_x(t,\tau)$ and second moment $c_x(t,\tau)$ such that:

1st moment: $r_x(t, \tau) = E\left\{x\left(t+\frac{\tau}{2}\right)x\left(t-\frac{\tau}{2}\right)^*\right\}$ 2nd moment: $c_x(t, \tau) = E\left\{x\left(t+\frac{\tau}{2}\right)x\left(t-\frac{\tau}{2}\right)\right\}$ A signal is stationary of 2nd order when the associated moments are independent of t:

$r_x(t,\tau)=r_{x0}(\tau)$ et $c_x(t,\tau)=c_{x0}(\tau)$

A signal is cyclostationary of 2nd order when these moments are periodic in t:

$r_x(t,\tau)=r_x(t+T_1,\tau)$ et $c_x(t,\tau)=c_x(t+T_2,\tau)$

We note that the periodicities $T_1$ and $T_2$ of the first and second moments are not necessarily equal. These two moments can then be expressed by Fourier series:

$r_x(t, \tau) = \sum_n r_x(n\alpha_1, \tau)\exp(j2\pi n\alpha_1 t)$ with $\alpha_1 = \frac{1}{T_1}$ $c_x(t, \tau) = \sum_n c_x(n\alpha_2, \tau)\exp(j2\pi n\alpha_2 t)$ with $\alpha_2 = \frac{1}{T_2}$ The Fourier coefficients $r_x(\alpha,\tau)$ and $c_x(\alpha,\tau)$ constitute the cyclic auto-correlation functions. They allow for correlation peaks for the cyclic frequencies α that are respectively multiples of $\alpha_1=1/T_1$ and $\alpha_2=1/T_2$ and are the Fourier transforms in "t" of the moments $r_x(t,\tau)$ and $c_x(t,\tau)$:

$r_x(\alpha, \tau) = \lim_{T\to\infty}\left[\frac{1}{T}\int_{-\frac{T}{2}}^{\frac{T}{2}} r_x(t, \tau)\exp\{-j2\pi\alpha t\}dt\right]$ $c_x(\alpha, \tau) = \lim_{T\to\infty}\left[\frac{1}{T}\int_{-\frac{T}{2}}^{\frac{T}{2}} c_x(t, \tau)\exp\{-j2\pi\alpha t\}dt\right]$ The cyclic auto-correlation functions $r_x(\alpha,\tau)$ and $c_x(\alpha,\tau)$ have for Fourier transform in τ the spectral correlations $\gamma_{x1}(\alpha,f)$ and $\gamma_{x2}(\alpha,f)$, such that:

$\gamma_{x1}(\alpha, f) = \int_\tau r_x(\alpha, \tau)\exp\{-j2\pi f\tau\}d\tau$ $\gamma_{x2}(\alpha, f) = \int_\tau c_x(\alpha, \tau)\exp\{-j2\pi f\tau\}d\tau$ If the functions $r_x(\alpha,\tau)$ and $c_x(\alpha,\tau)$ provide for correlation peaks for the cyclic frequencies α respectively multiples of $\alpha_1$ and $\alpha_2$, the same will be true for $\gamma_{x1}(\alpha,f)$ and $\gamma_{x2}(\alpha,f)$. The functions $\gamma_{x1}(\alpha,f)$ and $\gamma_{x2}(\alpha,f)$ are spectral correlations since they are expressed:

1st moment: $\gamma_{x1}(\alpha, f) = E\left[x\left(f+\frac{\alpha}{2}\right)x\left(f-\frac{\alpha}{2}\right)^*\right]$ 2nd moment: $\gamma_{x2}(\alpha, f) = E\left[x\left(f+\frac{\alpha}{2}\right)x\left(\frac{\alpha}{2}-f\right)\right]$ We note that on the first moment in α=0, we obtain the spectral density of the signal, in other words its frequency spectrum.

Non-stationary signals have moments $r_x(t,\tau)$ and $c_x(t,\tau)$ that depend on time "t", so the spectral correlations $\gamma_{x1}(\alpha,f)$ and $\gamma_{x2}(\alpha,f)$ are non-null, except for α=0 on the first moment. Unlike the cyclostationary signals, there is no correlation peak but instead energy continuums on the cyclic frequency α axis.

In the case of a signal of finite band B, the calculation space of the first moment and of the second moment can be limited to a determined space. Take, the example of a linear modulation and in particular of a Nyquist-filtered BPSK. This BPSK has a normalized bit rate of $\alpha_0=0.25$ with a normalized carrier frequency of $f_0=0.1$.

Figure 10:
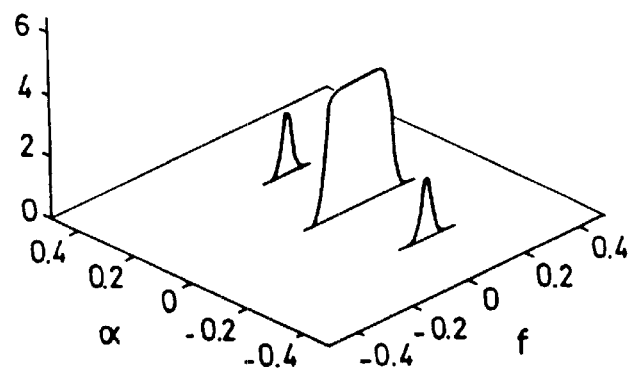
FIG. 10 shows the spectral correlation of the first moment of a signal with a Nyquist-filtered BPSK (linear modulation)

FIG. 10 represents the spectral correlation of the first moment:

$\gamma_{x1}(\alpha, f) = E\left[x\left(f+\frac{\alpha}{2}\right)x\left(f-\frac{\alpha}{2}\right)^*\right]$ 1st moment (BPSK)

FIG. 10 illustrates the fact that energy is present for the cyclic frequencies α that are multiples of the bit rate $\alpha_0$. Moreover, the spectrum in harmonic frequency is centered on $f=f_0$. Consequently, during detection of the pairs $(\alpha_k,f_k)$ presenting energy, it is necessary to poll the harmonic frequencies present in the acquisition band of the signal. We also note that the spectral correlation is symmetric about the axis α=0.

Figure 11:
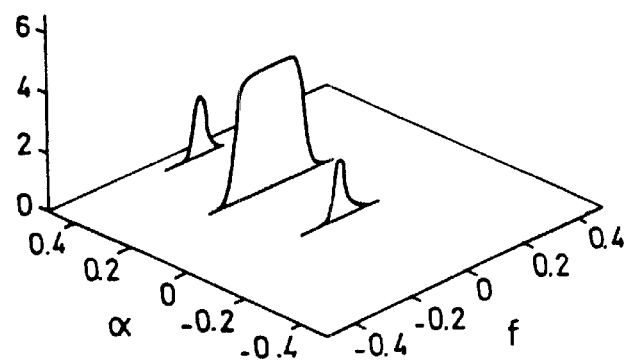
FIG. 11 shows the spectral correlation of the second moment of a signal with a Nyquist-filtered BPSK (linear modulation)

FIG. 11 shows the spectral correlation of the second moment:

$\gamma_{x2}(\alpha, f) = E\left[x\left(f+\frac{\alpha}{2}\right)\times\left(\frac{\alpha}{2}-f\right)\right]$ 2nd moment With the second moment, there is presence of energy for the cyclic frequencies α equal to $\alpha_0 k+2f_0$ (k is an integer).

The correlation peaks in cyclic frequency will depend both on the bit rate and the carrier frequency. For the detection of energy, it is therefore necessary to poll the cyclic frequencies between $-B_{acq}$ and $B_{acq}$ ($B_{acq}$ is the acquisition band of the signal). Moreover, the spectrum in harmonic frequency is centered on f=0. Consequently, when detecting the pairs ($\alpha_k, f_k$) presenting energy, it is necessary to poll the harmonic frequencies present in the band B of the signals, which can be very much narrower than the acquisition band $B_{acq}$. We note that the band of the signal in harmonic frequency is of the same order of magnitude as the bit rate.

Figure 12A:
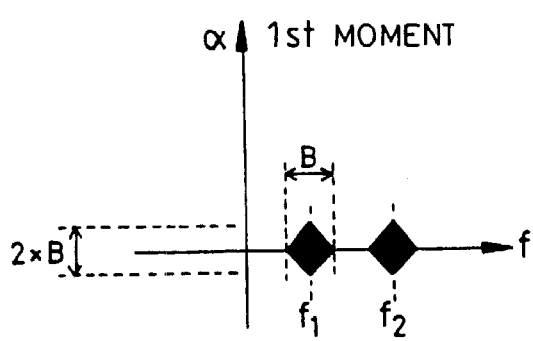
FIGS. 12a and 12b show the zones of interest in cyclic frequency/harmonic frequency space of the spectral correlations on the first and second moments of a signal of finite band B.
Figure 12B:
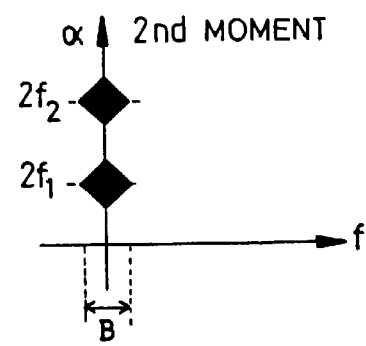

This example clearly illustrates that for a signal of finite band B and of carrier frequency $f_1$ (or $f_2$), the spectral correlations on the first and second moments are non-null in cyclic frequency/harmonic frequency zones dependent on $f_1$(or $f_2$) and B. FIGS. 12a and 12b represent schematically these zones of interest.

The band of the emitted signal is not always known on the reception side, whereas the transmission frequency channel used is known by its band $B_{max}$, which is characteristic of the transmission filter of the transmitter, and by its central frequency. We see therefore that significant energy is present on the first and second moments of the spectral correlation when:

$$\text{1st moment:} \quad 0 < \alpha < B_{max} \quad \text{and} \quad \frac{-B_{acq}}{2} \leq f \leq \frac{B_{acq}}{2}$$

$$\text{2nd moment:} \quad -B_{acq} < \alpha < B_{acq} \quad \text{and} \quad \frac{-B_{max}}{2} \leq f \leq \frac{B_{max}}{2}$$

Consequently, the cyclic detection is performed only in these cyclic frequency/harmonic frequency zones.

What is claimed is:

1. A process for cyclic detection of a diversity of polarized digital cyclostationary radioelectric signals comprising:

acquiring for any pair of antennas of a network of N antennas, N being at least two, over an observation period T and in an acquisition band $B_{acq}$, digital signals of sampling frequency Fe transmitted in a frequency channel of bandwidth $B_{max}$;

calculating, for each cyclic frequency of a determined cyclic frequency/harmonic frequency space limited by the bandwidth $B_{max}$ of the frequency channel and the acquisition band $B_{acq}$ of the digital signals acquired, a cyclic covariance matrix on a first moment of a spectral correlation of the acquired digital signals, and a cyclic covariance matrix on a second moment of a spectral correlation of the acquired digital signals; and detecting peaks of spectral correlation by comparing a likelihood ratio (V($\alpha$k)) determined from each cyclic covariance matrix (U($\alpha$k)) with a statistically determined detection threshold ($\beta_M$).

2. The process according to claim 1, wherein said acquisition of the digital signals comprises:

filtering, by a bank of M elementary band filters $B_{canal}$ whose outputs are under-sampled by a decimation factor RE and whose given central frequencies are chosen to assure a regular division of the acquisition band $B_{acq}$ such that $B_{acq} \leq M \times B_{canal}$, each digital radioelectric signal received on an antenna in packets of K samples, where K is given by the relation $$K = \frac{T \times Fe}{Re}; \text{ and}$$

storing each filtered digital signal in vectors (x ($f_k$,t)) whose components ($x_1(f_k,t), x_2(f_k,t), \ldots, x_N(f_k,t)$) correspond to the signals of the different antennas filtered by the same filter of a given central frequency ($f_k$).

3. The process according to claim 2, wherein said calculation of the cyclic covariance matrix (U($\alpha$k)) on the first moment comprises:

choosing two vectors (x($f_k$,t), x($f_m$,t)) of frequency $f_k$ and $f_m$;

whitening the two vectors to obtain two new vectors (z($f_k$,t), z($f_m$,t));

calculating K matrices U(t) given by the relation U(t)=z($f_k$,t)×z($f_m$,t)$^+$ corresponding to the observation period T; and calculating each component $u_{ij(\alpha k)}$ of the cyclic covariance matrix (U($\alpha$k)) by performing a fast Fourier transform on K points by taking the K points of the same index ij of the K matrices U(t).

4. The process according to claim 3, wherein said calculation of a cyclic covariance matrix (U($\alpha$k)) on the second moment comprises:

choosing two vectors (x($f_k$,t), x($-f_m$,t)) of frequency $f_k$ and $-f_m$;

whitening the two vectors to obtain two new vectors (z($f_k$,t), z($-f_m$,t));

calculating K matrices U(t) given by the relation U(t)=z($f_m$,t)×z($-f_m$,t)$^t$ corresponding to the observation period T; and calculating each component $u_{ij(\alpha k)}$ of the cyclic covariance matrix (U($\alpha$k)) by performing a fast Fourier transform on K points by taking the K points of the same index ij of the K matrices (U(t)).

5. The process according to claim 4, wherein for each cyclic frequency ($\alpha$k) of the given cyclic frequency/harmonic frequency space the likelihood ratio (V($\alpha$k)) is calculated applying the relation:

$$V(\alpha k) = -2BT \ln \{det(I - U(\alpha k).U(\alpha k)^+)\}$$

where I is the identity matrix and $B = B_{canal}$.

6. The process according to claim 1, wherein said detection threshold is determined by a chi-square law.

7. The process according to claim 1, wherein said pair of antennas is such that a maximums maximorum of sensitivity of the two antennas point in two orthogonal directions.

8. The process according to claim 1, wherein said pair of antennas is such that a maximums maximorum of sensitivity of the two antennas point in a same direction.

* * * * *